C. C. CURTIS.
Device for Felling Trees.

No. 162,534.    Patented April 27, 1875.

WITNESSES:
Chas. Nida
N. F. Perry

INVENTOR:
C. C. Curtis
BY
ATTORNEYS.

THE GRAPHIC CO. PHOTO-LITH. 39 & 41 PARK PLACE, N.Y.

UNITED STATES PATENT OFFICE.

CHARLES C. CURTIS, OF COOS, NEW HAMPSHIRE.

IMPROVEMENT IN DEVICES FOR FELLING TREES.

Specification forming part of Letters Patent No. 162,534, dated April 27, 1875; application filed March 29, 1875.

*To all whom it may concern:*

Figure 1:
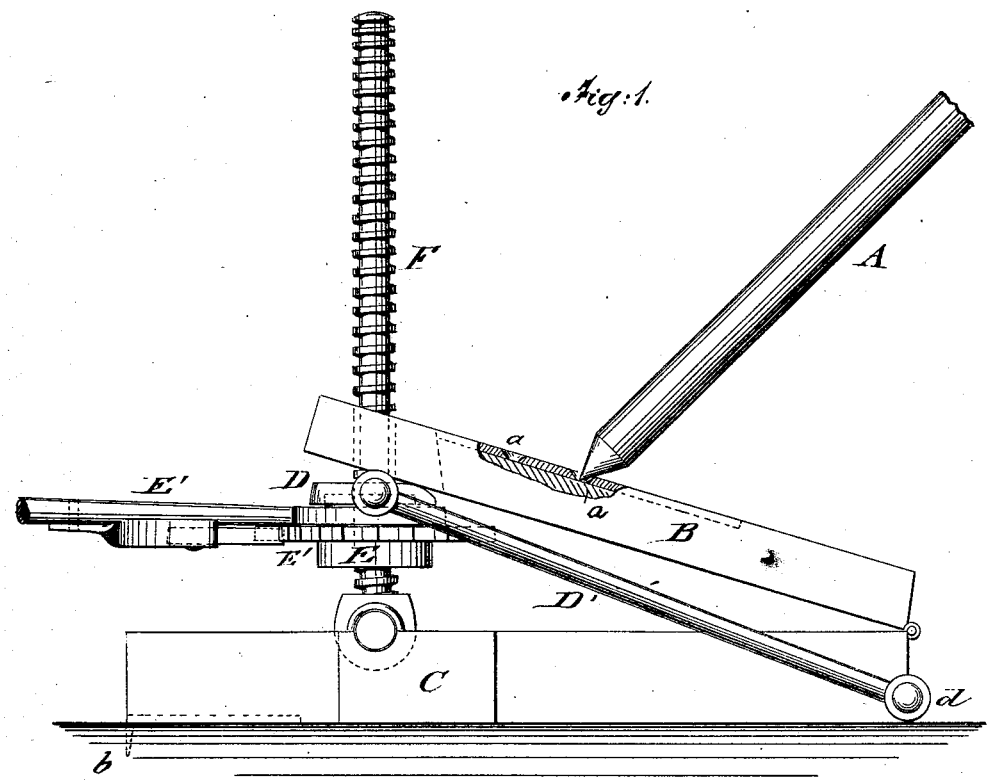
Figure 2:
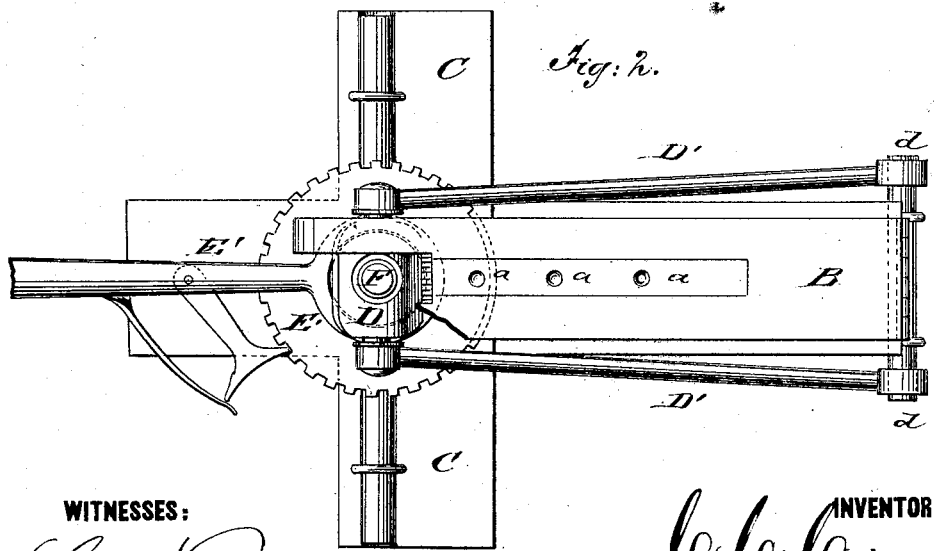

Be it known that I, CHARLES C. CURTIS, of Coos, Coos county, New Hampshire, have invented a new and Improved Device for Felling Trees, of which the following is a specification:

In the drawing, Figure 1 represents a side elevation of my improved device or apparatus for directing the falling of cut trees, and Fig. 2 is a top view of the same.

Similar letters of reference indicate corresponding parts.

The object of my invention is to provide a simple and effective device, by which the falling of sawed or cut trees in any desired direction may be controlled, and the breaking of the saws prevented. The invention consists of a spiked pole of suitable length, that is applied to the tree and seated on an adjustable inclined piece that is hinged to a base-frame, and raised to upset the tree by a suitable braced supporting-collar and elevating mechanism.

In the drawing, A represents the spiked detachable pole, which is applied at the desired height to the tree to be cut, and seated with the bottom end in recesses $a$ of a strong inclined piece, B. Piece B is hinged at its lower end to a broad base-frame, C, that is secured by dogs or teeth $b$ at the bottom to the ground, at the point opposite the direction in which the tree is intended to be thrown. The upper recessed end of piece B rests on a metallic collar, D, that is pivoted by additional side brace-rods D' to a lateral base-bolt, $d$, of frame C. The collar D is acted upon by a nut, E, with ratchet, pawl, and lever mechanism E', traveling on an upright screw-bolt, F, that is hinged by a lateral cross-piece to base-frame C, so as to adjust itself to the varying positions of the collar and inclined piece.

After the spiked pole and apparatus have been placed in the required position and the tree nearly cut or sawed, the elevating mechanism is brought into operation, so that the supporting-collar and inclined piece are raised, and thereby considerable force exerted on the tree by the pole, for carrying the tree toward the direction where the same is desired to fall. The apparatus is continued to be raised until the tree is upset, giving thereby a valuable and readily-operated means of controlling the exact place where the tree is wanted. For larger trees two or more of these devices may be used, so that an almost positive certainty as to the exact falling of the tree is obtained.

Having thus described my invention, I claim as new and desire to secure by Letters Patent—

A device for controlling the falling of cut or sawed trees in any required direction, being composed of a spiked detachable pole, a hinged inclined supporting-piece, with seats or recesses for the same, an intermediate supporting-collar with hinged brace-rods, and of an elevating mechanism to raise the inclined piece and force the pole against the tree, substantially as specified.

CHARLES C. CURTIS.

Witnesses:
GEORGE R. EATON,
C. C. TEBBETTS.